(12) United States Patent
Garrison

(10) Patent No.: US 7,780,399 B1
(45) Date of Patent: Aug. 24, 2010

(54) REVERSE PRESSURE DOUBLE DAM FACE SEAL

(75) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 895 days.

(21) Appl. No.: 11/653,077

(22) Filed: Jan. 12, 2007

Related U.S. Application Data

(60) Provisional application No. 60/758,408, filed on Jan. 12, 2006.

(51) Int. Cl.
*F04D 29/08* (2006.01)

(52) U.S. Cl. .......................................... 415/1; 277/400
(58) Field of Classification Search ................ 415/1, 415/175; 277/399, 400, 401, 544, 542, 546, 277/547, 552
See application file for complete search history.

(56) References Cited

U.S. PATENT DOCUMENTS

| | | | | |
|---|---|---|---|---|
| 3,383,033 A | 5/1968 | Moore | ...................... | 230/132 |
| 3,516,678 A | 6/1970 | Stein | ......................... | 277/27 |
| 3,632,117 A | 1/1972 | Villasor | ....................... | 277/3 |
| 3,675,935 A | 7/1972 | Ludwig et al. | ............... | 277/27 |
| 4,033,593 A | 7/1977 | Molnar et al. | ............... | 277/626 |
| 4,082,296 A | 4/1978 | Stein | ............................. | 277/3 |
| 4,395,048 A | 7/1983 | Timmermans et al. | ........ | 277/65 |
| 4,423,879 A | 1/1984 | Takenaka et al. | ............ | 277/96.1 |
| 5,137,284 A | 8/1992 | Holder | ........................... | 277/3 |
| 5,145,189 A | 9/1992 | Pope | ............................. | 277/3 |
| 5,217,232 A | 6/1993 | Makhobey | ..................... | 277/26 |
| 5,284,347 A | 2/1994 | Pope | ............................. | 277/1 |
| 5,449,180 A | 9/1995 | Monjean et al. | ............... | 277/28 |
| 5,451,065 A | 9/1995 | Holder | ........................... | 277/81 R |
| 5,503,407 A | 4/1996 | McNickle | ..................... | 277/134 |
| 5,509,664 A | 4/1996 | Borkiewicz | .................... | 277/3 |

(Continued)

FOREIGN PATENT DOCUMENTS

WO 98/14710 4/1998

(Continued)

OTHER PUBLICATIONS 15 page catalog of Surface Technologies Ltd. entitled LST Mechanical Seals Catalogue (Mar. 2004).

(Continued)

*Primary Examiner*—Edward Look
*Assistant Examiner*—Aaron R Eastman
(74) *Attorney, Agent, or Firm*—Michael Crilly, Esq.

(57) ABSTRACT

A double dam reverse pressure face seal assembly for use in the turbomachine having a tunnel extending through the machine for high pressure air passage therein during normal machine operating has a mating ring positioned annularly respecting the tunnel for flow of lubricating oil generally outwardly through passageways in the ring and a sealing member biased against an interface surface of the mating ring, the sealing member including a first dam presenting a first contact face to the interface surface of the mating ring, a second dam integral with an outboard of the first dam, presenting a second contact face to the interface surface of the mating ring and a channel between the first and second dams for annularly downward flow of oil leaking inwardly past the second dam towards a channel exit.

46 Claims, 12 Drawing Sheets

U.S. PATENT DOCUMENTS

| | | | | |
|---|---|---|---|---|
| 5,516,118 | A | 5/1996 | Jones | 277/3 |
| 5,558,341 | A | 9/1996 | McNickle et al. | 277/3 |
| 5,752,805 | A | 5/1998 | Gail et al. | 415/229 |
| 5,834,094 | A | 11/1998 | Etsion et al. | 428/156 |
| 5,941,532 | A | 8/1999 | Flaherty et al. | 277/400 |
| 5,952,080 | A | 9/1999 | Etsion et al. | 428/156 |
| 6,002,100 | A | 12/1999 | Etsion | 219/121.71 |
| 6,045,134 | A | 4/2000 | Turnquist et al. | 277/347 |
| 6,046,430 | A | 4/2000 | Etsion | 219/121.71 |
| 6,145,840 | A | 11/2000 | Pope | 277/348 |
| 6,145,843 | A | 11/2000 | Hwang | 277/400 |
| 6,152,452 | A | 11/2000 | Wang | 277/400 |
| 6,173,962 | B1 | 1/2001 | Morrison et al. | 277/355 |
| 6,257,589 | B1 | 7/2001 | Flaherty et al. | 277/400 |
| 6,293,553 | B1 | 9/2001 | Werner et al. | 277/355 |
| 6,338,490 | B1 * | 1/2002 | Bainachi | 277/400 |
| 6,341,782 | B1 | 1/2002 | Etsion | 277/399 |
| 6,536,773 | B2 | 3/2003 | Datta | 277/355 |
| 2004/0065649 | A1 | 4/2004 | Etsion | 219/121.68 |

FOREIGN PATENT DOCUMENTS

| | | |
|---|---|---|
| WO | 01/66982 | 9/2001 |
| WO | 02/46501 | 6/2002 |

OTHER PUBLICATIONS

J.F. Short et al., Advanced Brush Seal Development, 32$^{nd}$ AIAA/ASME/SAE/ASEE Joint Propulsion Conference, Jul. 1996 (AIAA 96-2907).

J.A. Fellensein et al., High Temperature Brush Seal Tuft Testing of Metallic Bristles Versus Chrome Carbide, 32$^{nd}$ AIAA/ASME/SAE/ASEE Joint Propulsion Conference, Jul. 1996 (NASA Technical Memorandum 107238—AIAA 96-2908).

M.F. Aksit et al., A Computational Model of Brush Seal Bristle Deflection, 32$^{nd}$ AIAA/ASME/SAE/ASEE Joint Propulsion Conference, Jul. 1996 (AIAA-96 2909).

R.E. Chupp, Update on Brush Seal Development for Large Industrial Gas Turbines, 32$^{nd}$ AIAA/ASME/SAE/ASEE Joint Propulsion Conference, Jul. 1996 (AIAA 96/3306).

R.P. Menendez, Recent Developments in Brush Seals for Large Industrial Gas Turbines, 36$^{th}$ AIAA/ASME/SAE/ASEE Joint Propulsion Conference, Jul. 2000 (AIAA 00/3374).

A. Gail et al., MTU Brush Seal—Main Features of an Alternative Design, 36$^{th}$ AIAA/ASME/SAE/ASEE Joint Propulsion Conference, Jul. 2000 (AIAA 00-3375).

Two page brochure entitled Pratt & Whitney—Specialty manufacturing—Brush Seals (date unknown).

P.C. Stein, Circumferential Seals for Use as Oil Seals, presented at 33$^{rd}$ Annual Meeting of ASLE, Apr. 1978.

Three (3) page International Search Report in connection with international application No. PCT/US06/038739.

Five (5) page Written Opinion of the International Search Authority in connection with international application No. PCT/US06/038739.

* cited by examiner

REVERSE PRESSURE DOUBLE DAM FACE SEAL

CROSS-REFERENCE TO RELATED PATENT APPLICATION

This patent application claims priority from and the benefit of the filing date of U.S. provisional patent application Ser. No. 60/758,408 filed 12 Jan. 2006 in the name of Glenn M. Garrison and entitled "Double Dam Reverse Pressure Face Seal".

BACKGROUND OF THE INVENTION

1. Field of the Invention

This invention relates to reverse pressure face seals for use in jet engines and other turbomachinery to reduce or even to prevent oil weepage through an interface between a seal member and a mating ring when there is a pressure reversal in the sealed chamber or tunnel portion of the engine.

2. Description of the Prior Art

Face seal assemblies for jet engines and other turbomachinery are known and typically include a rotating ring together with a stationary sealing member biased against the ring to prevent leakage therebetween. Lubricating oil typically flows outwardly through generally radial holes in the mating ring, exiting on the outer diameter of the ring. The oil on the outer diameter of the ring, typically referred to as the "oil side", is blocked against flow back into the space within the ring, typically referred to as the "air side", by the sealing member that is biased against the ring. When there is a pressure reversal in the interior chamber, or tunnel, which is the "air side" of the engine, pressure in the "air side" area of the engine drops to a level below the pressure on the "oil side", which may be located close to the exterior of the engine. The pressure reversal causes air to flow radially inwardly into the interior chamber or tunnel on the "air side" of the face seal in the engine, causing small amounts of oil to leak past the face seal. This radially inwardly leaking oil passing the seal, called "oil weepage" in the trade, is deleterious to the engine and, in aircraft engines, may result in the odor of oil leaking into the passenger cabin. Such pressure reversal may occur when the "reverse thrust" capability of the engine is used.

SUMMARY OF THE INVENTION

This invention relates to jet engines and other turbomachines having a central generally horizontal tunnel extending axially therethrough. Air passes through the tunnel at high speed and high pressure during normal operation. Conventionally, the turbomachine has a radially apertured mating ring for flow of lubricant oil generally radially outwardly through radial passages in the ring to cool the turbomachine. The mating ring rotates and is part of a face seal assembly that further includes a stationary preferably graphite sealing member that is axially biased, preferably by a wave spring, against an interface surface of the rotating preferably metal mating ring. The graphite sealing member includes a first sealing dam presenting a contact face to the annular interface surface of the rotating metal mating ring.

In one of its aspects this invention provides a second, preferably annular, sealing dam that is integrally formed as a part of the sealing member and is positioned radially spaced from an outboard edge of the first annular sealing dam. The second preferably annular sealing dam presents a contact face parallel to the interface surface of the rotating metal ring and perpendicular to the axis of the tunnel through which the air flows. The second preferably annular sealing dam is preferably integrally fabricated with the first annular sealing dam, with both being parts of the sealing member.

A preferably annular channel between the first and second annular sealing dams is provided for annular flow of oil that may leak radially inwardly past the second sealing dam, so that such annular flow of oil occurs before the oil reaches the first, inner sealing dam. Flow of oil within the annular channel is circumferential, towards the low point of the channel relative to the horizontal axis of the tunnel. The channel preferably has an annular bottom that is preferably generally flat and preferably perpendicular to the tunnel axis, which is typically horizontal in the course of normal machine operation. The first annular sealing dam has a first contact face connecting to the annular channel via a wall that is preferably generally perpendicular to the channel bottom and hence is parallel to the tunnel axis. The second sealing dam has a second contact face connecting to the annular channel by a wall that is diagonal respecting the annular channel bottom and the second contact face, and hence is not parallel to the tunnel axis.

In another one of its aspects this invention provides a double dam reverse pressure face seal assembly for use in a turbomachine having a tunnel extending therethrough for high pressure air passage therein during normal machine operation, where the assembly includes a mating ring positioned annularly respecting the tunnel for flow of lubricating oil generally outwardly through bore-like passageways in the ring, a member biased against an interface surface of the mating ring with the member including a first dam presenting a first contact face to an interface surface of the mating ring, a second dam integral with and outboard of the first dam, presenting a second contact face to the interface surface of the mating ring, and a channel between the first and second dams for downward annular flow therealong, towards a channel exit, of oil leaking inwardly past the second dam.

In still another one of its aspects this invention provides a double dam reverse pressure face seal assembly for use in a turbomachine having a tunnel extending therethrough for high pressure air passage therein during normal machine operation, where the assembly comprises a mating ring having generally radially oriented bore-like passageways extending therethrough commencing at the apertures, the ring being positioned annularly respecting the tunnel for flow of lubricating oil generally outwardly through the passageways. In this aspect of the invention the double dam reverse pressure face seal assembly further includes a stationary member biased against an interface surface of the mating ring, with the stationary member including a first sealing dam presenting a first contact face to the interface surface of the mating ring and a second sealing dam outboard of the first sealing dam, presenting a second contact face to the interface surface of the mating ring with the second sealing dam being integral with the first sealing dam, and a channel between the first and second sealing dams for flow of oil inwardly of the second sealing dam towards a channel exit. In this aspect of the invention the mating ring further may have grooves formed in the surface facingly contacting the stationary member with the grooves communicating with an outer edge of the mating ring but terminating short of an inner edge of the mating ring, with the grooves being shaped such that a groove inner terminus leads a groove outer terminus during mating ring rotation during machine normal operation. At least a portion of the groove overlies the channel. During operation, minimal or zero pressure at the groove interior ends causes oil in the annular channel to gather in the grooves, whereupon rotation of the mating ring and windage causes the oil to exit the grooves at the outer edge of the mating ring, thereby helping to maintain the channel clear of oil.

In this aspect of the invention the grooves are preferably curved. However, the grooves may be straight or may be skew to the axis of rotation of the mating ring, the grooves may be spaced apart angularly one from another, or may be contiguous. The grooves may be of constant depth or may be of varying depth. Appropriate ones of these variations in the groove parameters may be combined.

In yet another of its aspects this invention provides a turbomachine with a tunnel extending therethrough for high pressure air travel through the turbomachine during normal machine operation, that includes a double dam reverse pressure face seal assembly separating a region of the tunnel and high pressure air traveling therethrough from a lubricating oil region, which is at lower pressure than the air traveling through the tunnel during normal machine operation, where the double dam reverse pressure face seal assembly includes an apertured mating ring positioned annularly respecting the tunnel for flow of lubricating oil from within the tunnel generally outwardly through the ring apertures to the lubricating oil region. The double dam reverse pressure face seal assembly further includes a stationary member biased against an interface surface of the mating ring, with the stationary member including a first annular sealing dam presenting a first contact face to the interface surface of the mating ring, a second annular sealing dam positioned radially outboard of the first annular sealing dam and presenting a second contact face to the interface surface of the mating ring, the second annular sealing dam being integral with the first sealing dam, and an annular channel between the first and second annular sealing dams for flow of any lubricating oil leaking inwardly from the lubricating oil region past the second annular sealing dam towards a channel exit.

In yet another of its aspects the invention provides, in the turbomachine described immediately above, a mating ring which further comprises grooves formed on the surface of the ring facingly contacting the stationary member, with the grooves communicating with an inner edge of the mating ring but terminating short of an outer edge of the mating ring, with the grooves being shaped such that a groove outer terminus leads a groove inner terminus during mating ring rotation during normal machine operation, and the grooves overlie and thereby are in fluid communication with the annular channel between the first and second annular sealing dams during normal machine operation. In this aspect of the invention, the grooves overlie the channel, collect air from the air side as the mating ring rotates, and force the air into the channel thereby increasing internal channel pressure to prevent oil leakage into the channel from the lower pressure oil side.

In yet still another of its aspects this invention provides a method for sealing a turbomachine tunnel having pressure air passing therethrough during normal operation from lubricating oil leakage thereinto from an adjacent area that is normally filled with oil mist at pressure substantially lower than the high pressure air, upon a pressure reversal and the adjacent area reaching pressure higher than in the tunnel. The method includes positioning a second face sealing member coaxially radially outboard of and spaced from a conventional stationary first face sealing member, to contact a rotatable mating ring outboard of the conventional stationary first face sealing member, with the second face sealing member being longitudinally aligned with but radially spaced from the first sealing member to define an annular closed bottom channel therebetween. The method further comprises providing an outlet from the channel through the second sealing member at the vertical bottom of the second sealing member for passage of oil therethrough from the annular passageway between the sealing members into the oil mist area. Desirably the outlet from the channel through the second sealing member at the second sealing member for passage of oil therethrough is deeper than the annular closed bottom channel between the face sealing members.

This method aspect of the invention further embraces providing grooves in a surface of the mating ring that facingly contacts the first and second face sealing members, with the grooves communicating with an outer edge of the mating ring but terminating short of an inner edge of the mating ring, and being shaped such that a grove inner terminus rotatingly leads a groove outer terminus during mating ring rotation in the course of normal machine operation. In this aspect of the invention the mating ring is positioned so that portions of the grooves overlie the annular channel between the first and second face sealing members whereby windage resulting from mating ring rotation draws oil from the annular channel through the grooves for discharge preferably outwardly of the outboard one of the face sealing members.

An alternate approach to this method aspect of the invention further embraces providing grooves in a surface of the mating ring that facingly contacts the first and second face sealing members, with the grooves beginning at and thereby communicating with an interior edge of the mating ring, but terminating short of a the outer edge of the mating ring. The grooves are shaped such that a grove radially inner terminus, at an interior edge of the mating ring, rotatingly leads a groove outer terminus, which is located within the surface of the mating ring and does not communicate with the outer edge of the mating ring, during mating ring rotation in the course of normal machine operation. In this aspect of the invention the mating ring is positioned so that portions of the grooves overlie the annular channel between the first and second face sealing members. As a result, windage resulting from mating ring rotation drives air from the air side and desirably from within the tunnel into and along the grooves for discharge into the annular channel that portions of the grooves overlie, thereby to increase the air pressure in the annular channel above the pressure outboard of the second annular sealing dam defining the outer boundary, pressure wise, of the annular graphite sealing member. With this approach, the relatively higher air pressure in the annular channel prevents oil seepage across the second annular sealing dam since the pressure in the channel is above the pressure of the "oil side" on the outboard side of the second annular sealing dam.

DESCRIPTION OF THE DRAWINGS

In FIG. 3, the hatch marks do not denote sectioning; the hatch marks denote contact faces that effectuate sealing between surfaces.

Many of the drawings that are sections have not been sectioned with conventional hatch marks. In some of the drawings hatch marks have been used in emphasizing other features, to enhance drawing clarity.

DESCRIPTION OF THE PREFERRED EMBODIMENTS AND BEST MODE KNOWN FOR PRACTICE OF THE INVENTION

Figure 1:
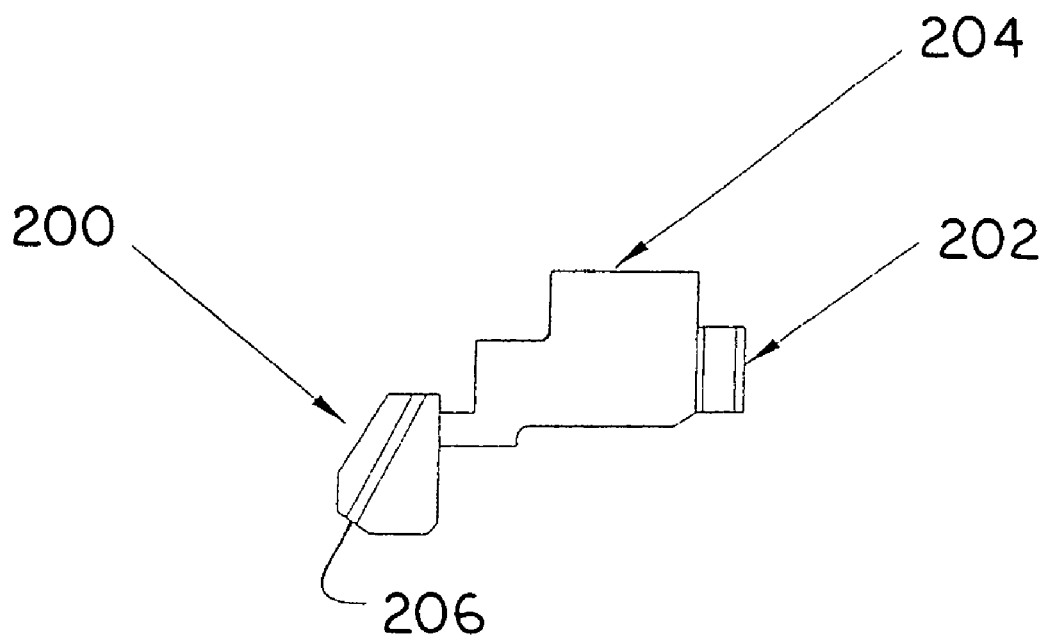
FIG. 1 is a side elevation, in schematic form, of part of a reverse pressure face seal according to the prior art.

Referring to the drawings in general and to FIG. 1 in particular, a reverse pressure face seal according to the prior art as illustrated in schematic form in side elevation. The reverse pressure face seal according to the prior art includes a mating ring 200, a wave spring 202 biasing an annular sealing member 204 against mating ring 200. Mating ring 200 is equipped with an oil flow passageway 206 for flow of lubricating, cooling oil from the high pressure side within the turbomachine, indicated by the legend "high pressure air" to the oil mist side within the turbomachine, indicated by the legend "oil side". Both mating ring 200 and sealing member 204 are annular in the sense that both are of ring-like configuration, with open centers for passage of the high pressure air through the open center of mating ring 200 and the open center of annular sealing member 204. Wave spring 202 biases annular sealing member 204 to the left in FIG. 1, against mating ring 200.

Figure 2:
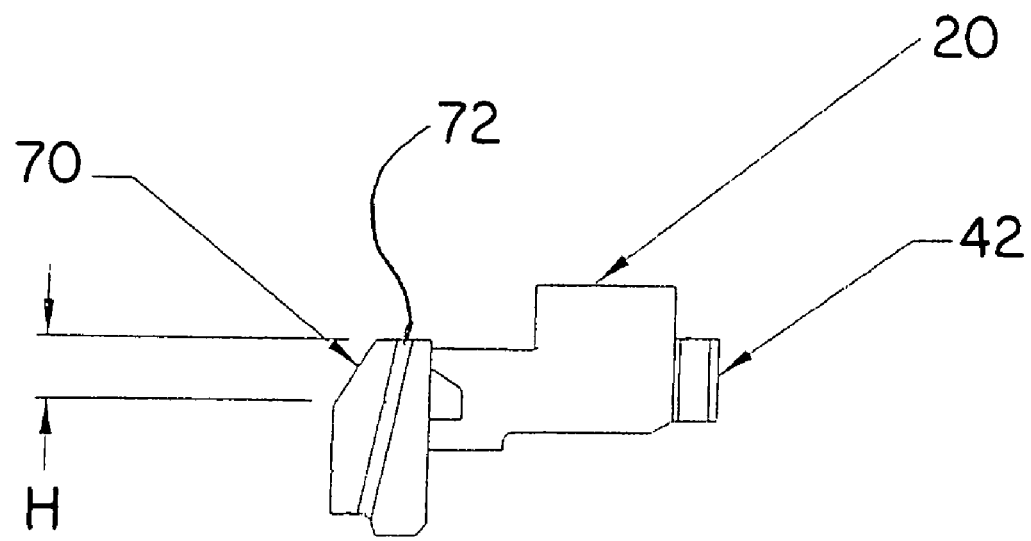
FIG. 2 is a side elevation, in schematic form, of part of a double dam reverse pressure face seal according to the invention.

Referring to FIG. 2, there is shown, in side elevation and in schematic form, a part of a double dam reverse pressure face seal according to the invention. In FIG. 2 the dimensional arrows H indicate an additional portion of a mating ring, denoted 70 in FIG. 2, provided to accommodate the second annular sealing dam which has been incorporated into annular preferably graphite sealing member 20, as described in more detail below. As with the structure illustrated in FIG. 1, a wave spring 42 urges annular, preferably graphite, sealing member 20 to the left in FIG. 2, against mating ring 70. Passageway 72 within mating ring 70 permits flow of cooling lubricating oil from the high pressure air region indicated by the legend "high pressure air" through mating ring 72 into the oil mist region indicated by the legend "oil side", all within the turbomachine engine.

Figure 3:
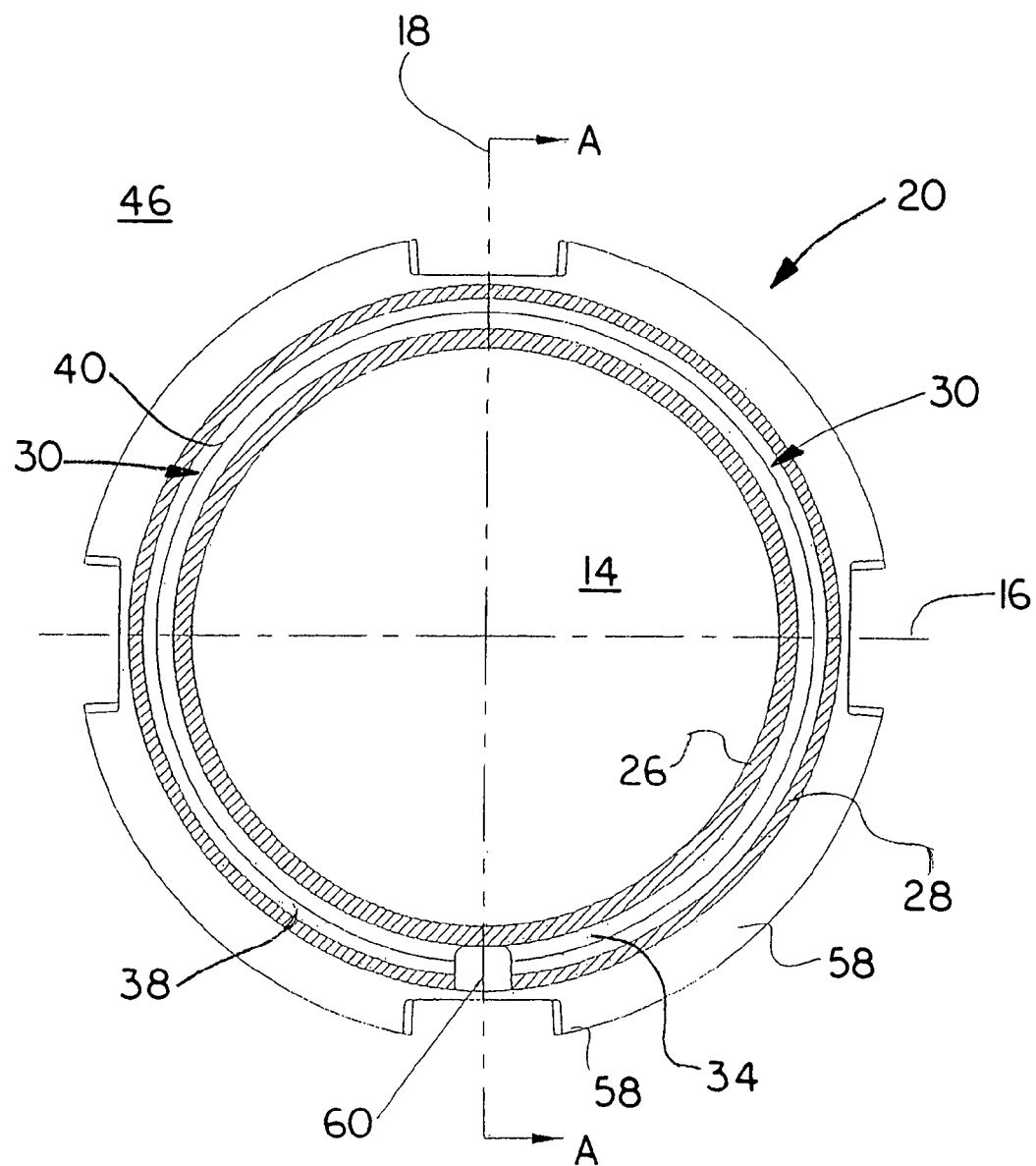
FIG. 3 is an elevation, taken perpendicularly to the longitudinally extending central axis of a turbomachine, of an annular, preferably graphite sealing member of a double dam reverse pressure face seal assembly manifesting aspects of the invention.

Referring to FIG. 3, an annular preferably graphite sealing member 20 is illustrated in elevation in FIG. 3 and has an open, circular center forming a portion of a tunnel 14, which typically extends entirely through the jet engine or other turbomachine in which the double dam reverse pressure face seal assembly of the invention is installed.

In FIG. 3 the horizontal axis of the turbomachine is designated 16 while the vertical axis of the turbomachine is designated 18 and preferably is coincident with section line A-A shown in FIG. 3. Further illustrated in FIG. 3 are two annular contact faces, with 26 denoting an inboard annular contact face and 28 denoting an outboard annular contact face, both shown in cross-hatching. These annular contact faces are the loci at which the contacting portions, namely the faces 26, 28 of first and second annular sealing dams 22, 24, are facingly biased against mating ring 70, shown in FIG. 2 but which is not illustrated in FIG. 3. Generally, annular, preferably graphite, sealing member 20 preferably further includes a mounting flange 58 positioned at the outboard periphery of sealing member 20, for securing sealing member 20 in the turbomachine of interest.

The actual sealing closure provided by the reverse pressure double dam face seal against rotating mating ring 70 is preferably effectuated by preferably annular, preferably graphite, stationary sealing member 20 riding against rotating ring 70, which is not illustrated in FIG. 3. Sealing member 20 is shown only in part in FIGS. 3 through 6 to enhance drawing clarity.

Annular graphite sealing member 20 includes a first preferably annular inboard sealing dam designated 22 in FIGS. 3 through 6, and a second preferably annular outboard sealing dam designated 24 in FIGS. 3 through 6. First annular sealing dam 22 includes a first contact face 26 while second annular sealing dam includes a second contact face 28, with both contact faces 26, 28 being illustrated and numbered in FIGS. 3 through 6. First contact face 26 contacts rotating mating ring 70 as indicated by the cross hatching of first contact face 26 in FIG. 3. Second contact face 28 contacts mating ring 70 as indicated by the cross hatching of second contact face 28 in FIG. 3.

First and second annular sealing dams 22, 24 are preferably integrally formed on annular graphite sealing member 20, with annular, preferably graphite, sealing member 20 and the associated sealing dams 22 and 24 preferably being a single, unitary piece of graphite. Desirably, annular graphite sealing member 20 is machined from a single, solid piece of graphite with first and second annular sealing dams 22, 24 being formed during the machining process.

Figure 4:
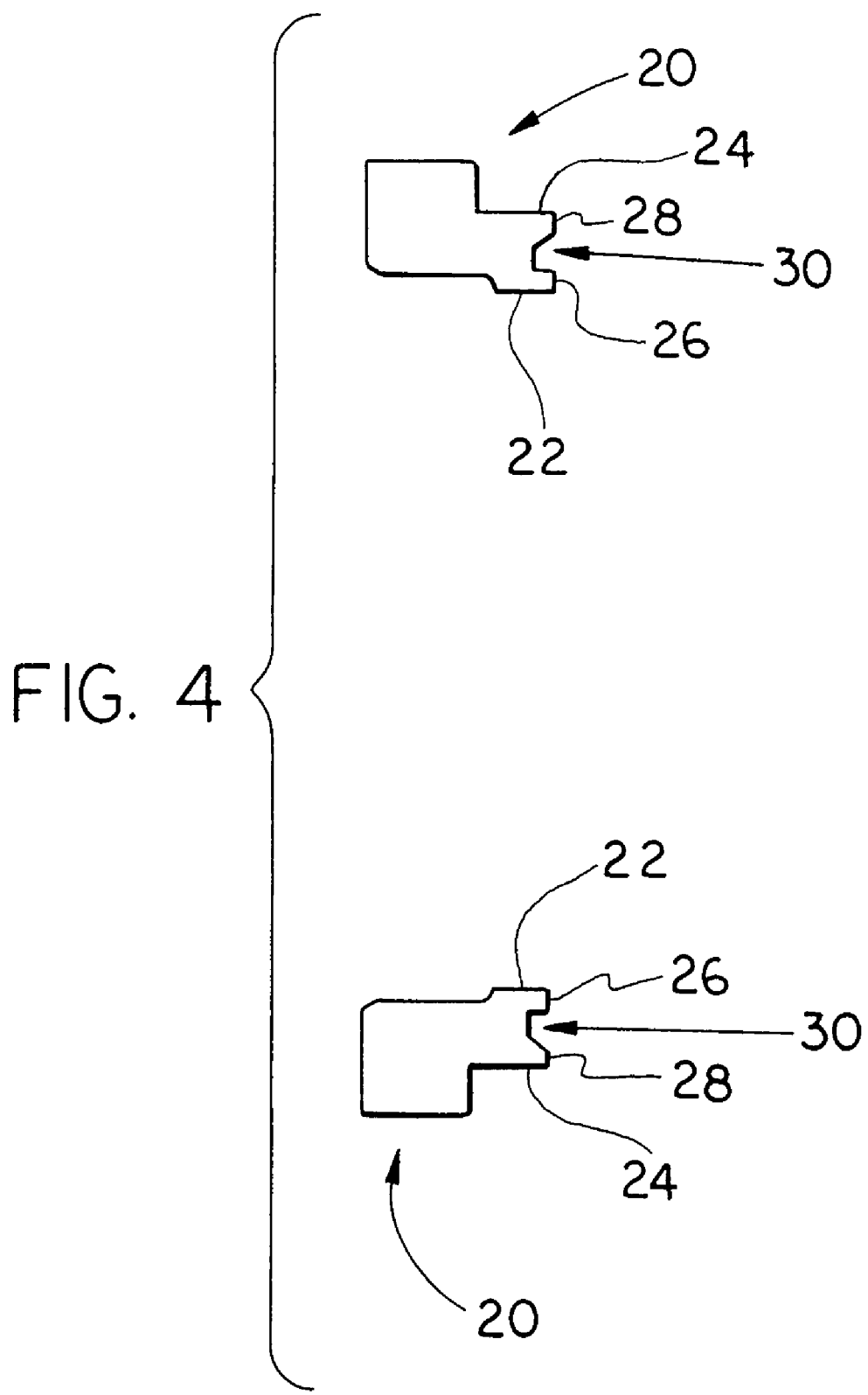
FIG. 4 is a schematic side elevation in section of the sealing member of a reverse pressure double dam face seal assembly manifesting aspects of the invention, where arrows A-A in FIG. 3 indicate the general position at which the section illustrated in FIG. 4 is taken. Section lines have been omitted in FIG. 4 to enhance drawing clarity. Similarly, the portions of the sealing member that are not cut by the section-indicating line and arrows A-A in FIG. 3 have not been illustrated in FIG. 4, to enhance drawing clarity.
Figure 5:
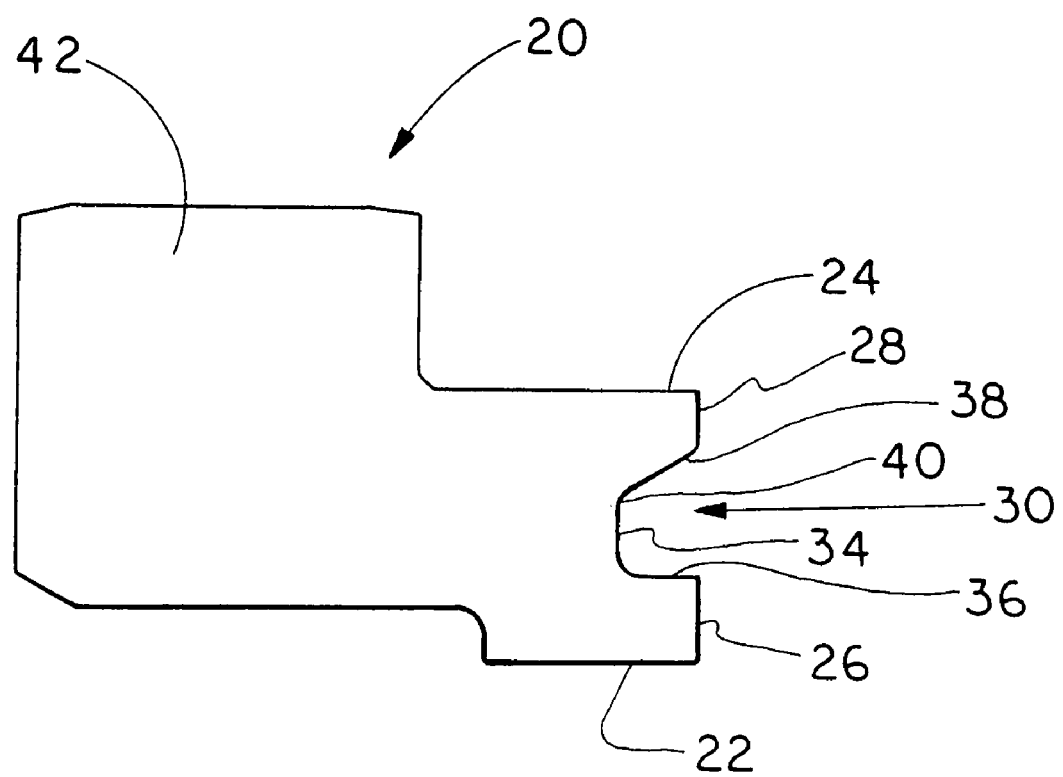
FIG. 5 is an enlarged view of the upper portion of the part of the sealing member illustrated in FIG. 4.
Figure 6:
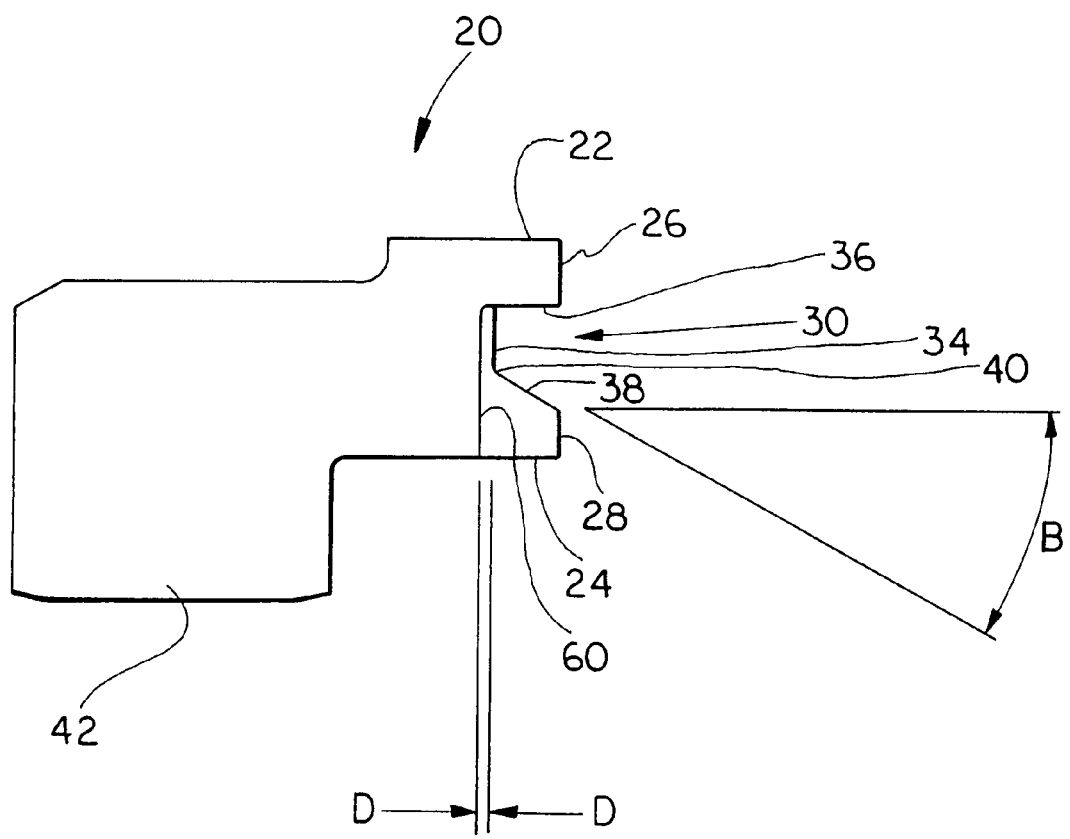
FIG. 6 is an enlarged view, similar to FIG. 5, of the lower portion of the part of the annular sealing member illustrated in FIG. 4.

Space between first and second contact faces 26, 28 is defined by an annular channel designated generally 30 in FIGS. 3 through 6. Annular channel 30 has a channel bottom 34, best illustrated in FIGS. 5 and 6, which is preferably essentially parallel with first and second contact faces 26, 28, as illustrated and numbered in FIGS. 3 through 6. First contact face 26 preferably connects to channel bottom 34 via a wall 36, which is essentially perpendicular to first contact face 26, as shown in FIGS. 5 and 6. Second contact face 28 preferably connects to channel bottom 34 via an inclined wall 38 as shown in FIGS. 5 and 6.

Figure 8:
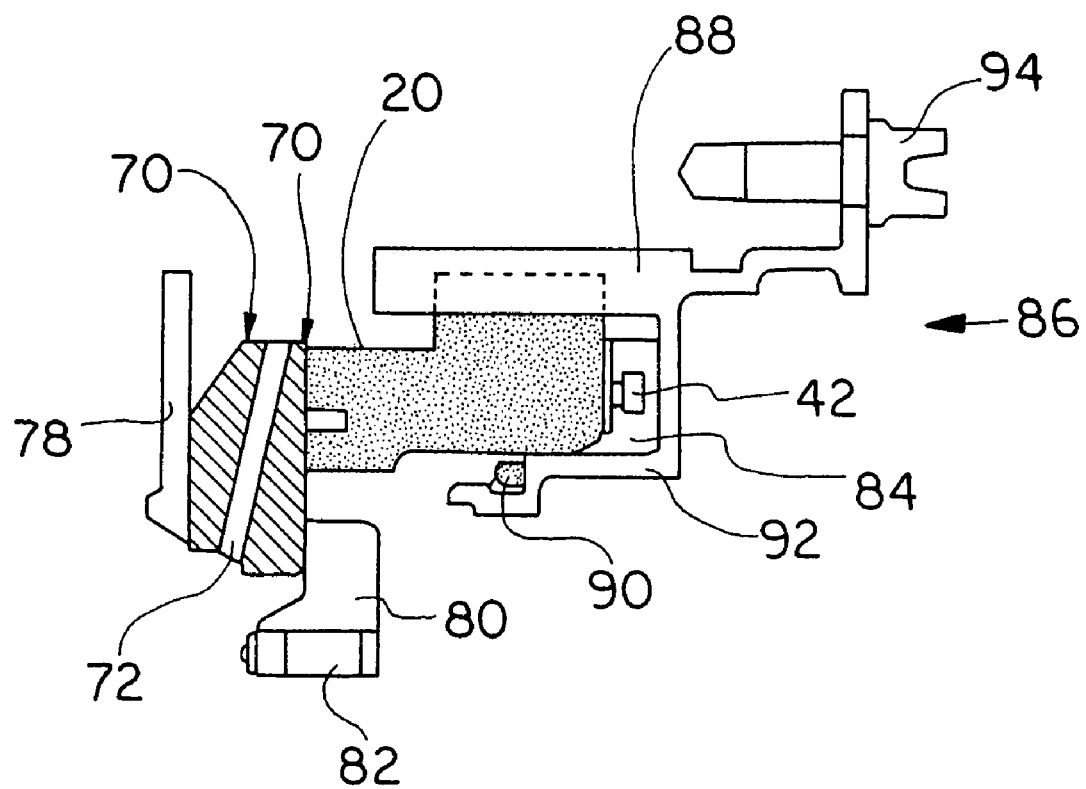
FIG. 8 is a partially sectioned side elevation, in schematic form, of a portion of a reverse pressure double dam face seal assembly according to the invention, showing the seal assembly mounted in a turbomachine.

Annular preferably graphite sealing member 20 is preferably biased against mating ring 70 preferably by a circumfential wave spring, which has been depicted schematically and is designated generally 42 in FIGS. 2 and 8. Wave spring 42 preferably fits about suitable longitudinal protrusions, which have not been numbered, extending axially from a rear portion of sealing member 20, as depicted in FIG. 8.

Mating ring 70 is preferably equipped with a number of generally preferably radially oriented passageways 72, one of which is illustrated in FIGS. 2 and 8, extending through mating ring 70, for cooling lubricating oil to flow radially outwardly therethrough. Oil mist resides in region 46, which is the "oil side" indicated in FIG. 2, during operation of the turbomachine.

The portion of mating ring 70 facingly contacted by respective inboard and outboard contact faces 26, 28 is typically hard surfaced using conventional hard surfacing material, preferably chrome carbide hard surfacing.

Bias of preferably annular graphite sealing member 20 against mating ring 70 is provided desirably not only by wave spring 42 but also by air pressure during operation of the turbomachine.

Figure 9:
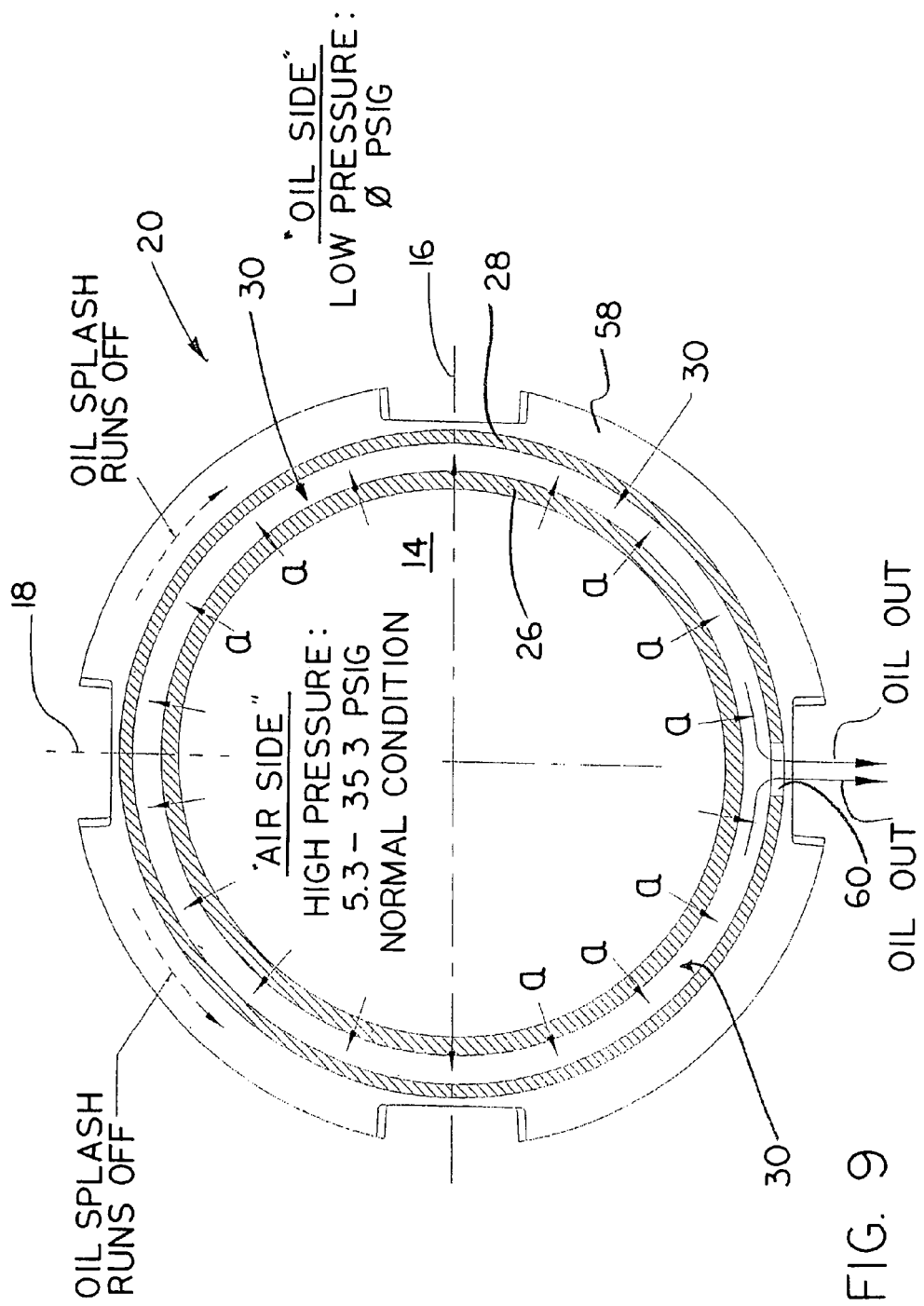
FIG. 9 is a schematic view similar to FIG. 3 depicting oil flows in a reverse pressure double dam face seal according to the invention during normal operation of a turbomachine in which the reverse pressure double dam face seal is installed.

Referring to FIGS. 3 and 9 and particularly to FIG. 9, during normal operation of the turbomachine, mating ring 70, which is not illustrated in FIG. 3 nor in FIG. 9, rotates and rides against first and second contact faces 26, 28 of annular graphite sealing member 20. Due to high air pressure in the "air side", which air pressure normally ranges between about 5.3 and about 35.3 psig, as indicated on FIG. 9, some droplets of oil seep between or oil weepage occurs between mating ring 70 and first contact face 26. This is because there is some small amount of oil mist present in the air side lubricating the high speed turbomachine parts residing within tunnel 14 of the machine. Since pressure on the "oil side" is 0 psig, necessarily there is some oil weepage radially outwardly across first contact face 26 forming a part of first annular sealing dam 22. This outward leakage is indicated by arrows "a" in FIG. 9. The oil leakage tends to be essentially uniform about the circle defined by first contact face 26 of first annular sealing dam 22 as indicated by placement of the arrows "a" in FIG. 9. Not all of the arrows have been marked with the legend "a" to enhance drawing clarity. However, the relatively even spacing of the arrows "a" denotes the relatively uniform weepage of the oil across the interface between first contact face 26 of first annular sealing dam 22 and mating ring 70.

As the oil crosses the interface between first contact face 26 and mating ring 70, the oil reaches annular channel 30. The oil then flows, due to the force of gravity, downwardly within channel 30 to the vertical low point of channel 30 illustrated in FIG. 9 where a drain slot 60 is located. The oil then drains out of annular channel 30 through drain slot 60 as indicated by two parallel arrows labeled "oil out". There may additionally be some oil splash as oil outside of annular graphite sealing member 20 runs off the exterior of second annular sealing dam 24, as indicated by the legend "oil splash runs off" and the associated arrow pointing to mounting flange 58 on which a dotted arrow denotes flow of oil splash along the surface of mounting flange 58 in a generally downward direction. Since the pressure on the "air side" within tunnel 14 is higher than pressure on the "oil side" outboard of annular graphite sealing member 20, oil will not flow inwardly from the oil side to the air side across the interface of annular graphite sealing member 20 and mating ring 70 during normal conditions, as illustrated in FIG. 9.

Cooling lubricating oil, which normally flows through radial passageway 72 in mating ring 70 and exits at the outer diameter of mating ring 70, is sealed to the outside, namely to the "oil side", by the face sealing assembly provided by stationary first and second contact faces 26, 28 being biased against rotating mating ring 70. During turbomachine operation, air pressure in the tunnel, on the "air side" of the seal, sometimes drops below the pressure on the "oil side" of the seal, outside the tunnel when there is a pressure reversal in the tunnel of the engine, which may occur during normal engine operation. Upon such a pressure reversal in an engine equipped with a conventional prior art seal such as illustrated schematically in FIG. 1, oil weepage tends to flow radially inwardly, causing oil to leak by the single face seal, when only a first annular sealing member 204 with only a single contact face is present, as illustrated schematically in FIG. 1. This is undesirable.

Figure 10:
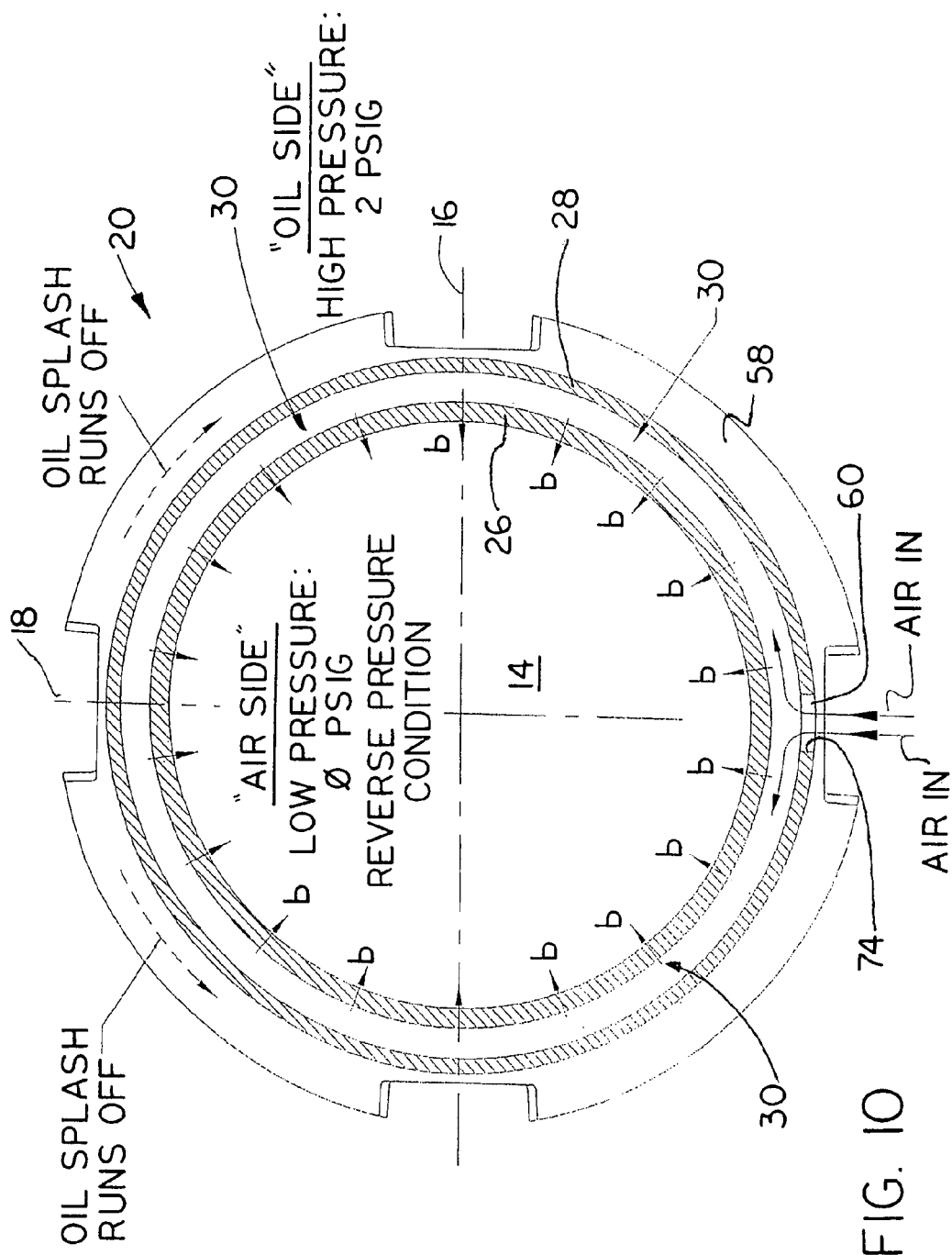
FIG. 10 is a schematic view similar to FIG. 3 depicting oil flows in a reverse pressure double dam face seal according to the invention under a reverse pressure condition within a turbomachine in which the reverse pressure double dam face seal is installed.

With the invention, presence of second annular sealing dam 24 with second contact face 28 biased against mating ring 70, with such biasing contact being indicated by the hatching of second contact face 28 in FIG. 3, provides a barrier preventing oil from leaking through the interface between annular member 20 and mating ring 70. Referring to FIGS. 3 and 10, when there is a pressure reversal, which typically is on the order of between two and four pounds per square inch, air enters slot 60 as indicated by the arrows labeled "air in" in FIG. 10 and fills annular channel 30 between first and second annular sealing dams 22, 24. The air then flows radially inwardly across first annular sealing dam 22 only, which is the innermore of the two sealing dams 22, 24. The inward air flow across first annular sealing dam 22 is essentially evenly distributed around the circular periphery of first annular sealing dam 22 and is indicated by arrows "b" in FIG. 10. Not all of the inward air flow indicator arrows in FIG. 10 have been labeled "b" to enhance drawing clarity.

As a result of air flow into annular channel 30 through drain slot 60 as indicated by the arrows labeled "air in", the pressure outboard of second annular sealing member and the pressure with channel 30 are equal, so there is no air pressure differential across second annular sealing dam 24, which is the outer dam, and therefore no oil weepage occurs across the outboard second contact face 28 shown in hatch marks in FIGS. 3 and 10. In other words, second annular sealing dam 24, being the outer of the two dams, acts as a barrier to such oil weepage; since there is no differential pressure across second annular sealing dam 24, no oil weeps thereacross.

Any lubricating oil entering annular channel 30 between first and second sealing dams 22, 24 flows circularly in part due to gravity and in part due to windage created by rotation of mating ring 70. When oil reaches drain slot 60, which is located at the bottom of annular graphite sealing member 20 as shown in FIGS. 3, 9 and 10, and with the oil having flowed circumferentially partially around and downwardly within annular channel 30 due to force of gravity, the oil drains downwardly back to the oil side of the face seal assembly 10. As with oil splash during the normal operating condition illustrated in FIG. 9, oil splash may run off on the surface of the outboard mounting flange 58 when there is a reverse pressure condition, as indicated in FIG. 10.

Drain slot 60 is deeper than annular channel 30. Slot 60 being deeper (considering depth in the axial direction) than annular channel 30 provides a trench with a sharp edge 74 at the juncture of slot 60 and annular channel 30, for stopping the otherwise continuing circumferential flow of oil around annular channel 30.

Wall 38 connecting second contact face 28 with channel bottom 34 is inclined, as best illustrated in FIGS. 4 through 6, with the angle of incline denoted "B" in FIG. 6. Angle "B" is preferably on the order of thirty (30) degrees.

In the event oil leaks past second annular sealing dam 24 and into annular channel 30 in the area of the upper half of the sealing assembly, above horizontal axis 16 in FIG. 3, the oil then flows downwardly along inclined surface 38 towards channel bottom 34 and away from first annular sealing dam 22, and especially away from first contact face 26; this is best visualized in FIG. 5, where inclined surface 38 is inclined downwardly from a position of intersection with second contact face 28 to a position of intersection with channel bottom 34.

In the event oil leaks past second annular sealing dam 24 and annular channel 30 of the area of the lower half of the sealing assembly, below horizontal axis 16 in FIG. 3, inclination of surface 38 together with gravity directs any oil flowing in annular channel 30 towards second annular sealing dam 24, which is the outer of the two sealing dams, and hence towards drain slot 60 at the bottom of the annular graphite sealing member 20, away from first annular sealing dam 22, which is the inner of the two sealing dams. This is best visualized in FIG. 6, where individual surface 38 is inclined downwardly from a position of intersection with channel bottom 34 to a position of intersection with seal central face 28.

Figure 7:
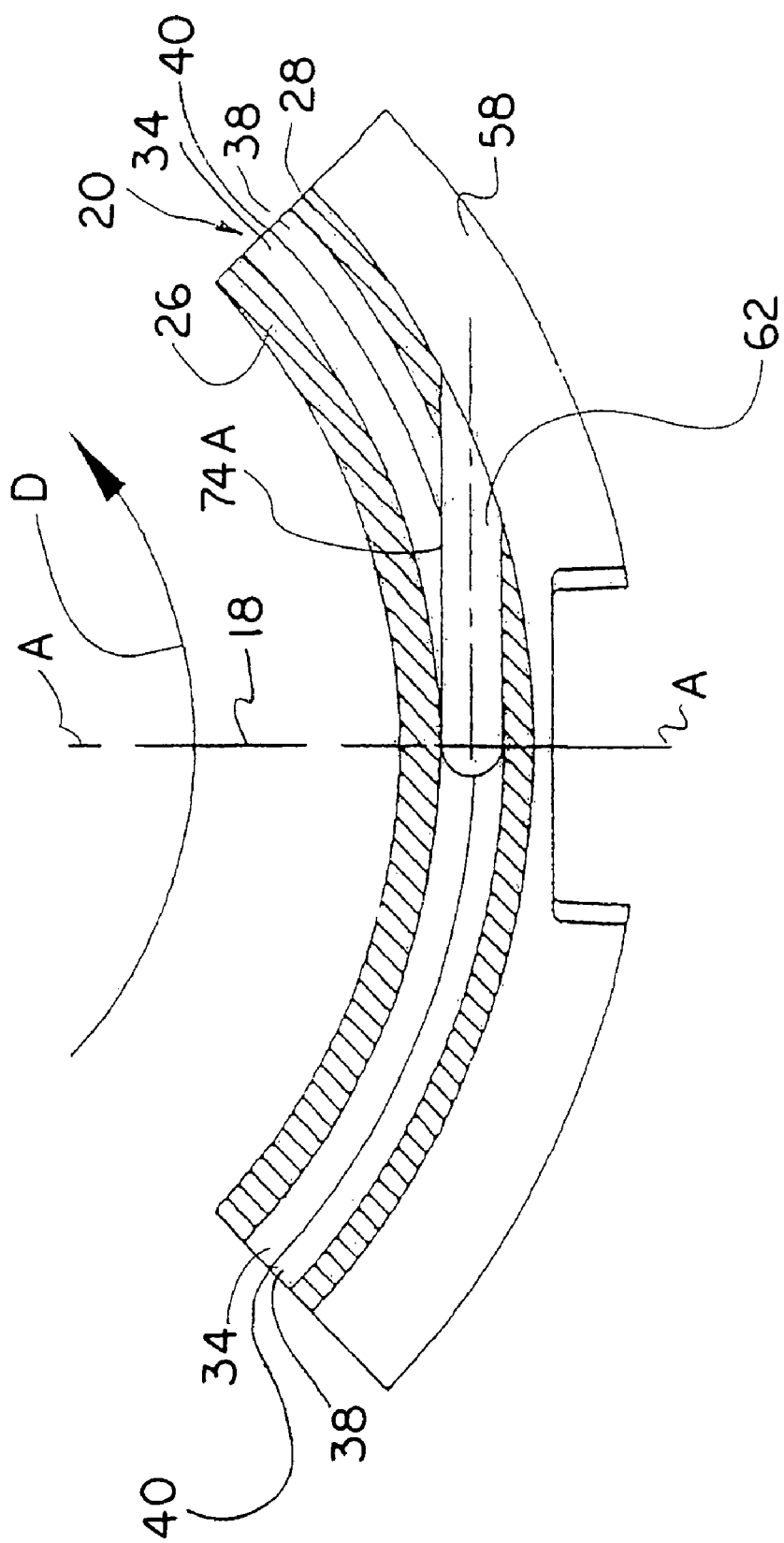
FIG. 7 is a view, in elevation, taken of a segment of an alternate embodiment to the annular sealing member shown in FIG. 3, having a tangential drainage slot located at the vertical low point of the annular sealing member.

In the embodiment of the invention illustrated in FIG. 7, where an outlet slot from annular channel 30 has been tangentially configured and is denoted 62, windage created by rotation of the mating ring in the direction indicated by arrow D pushes oil out of annular channel 30 via tangential outboard slot 62. Outlet slot 62 is preferably deeper than annular channel 30 and is preferably formed by cutting through second annular sealing dam 24, with the second contact face 28 thereof being shown in FIG. 7. In the embodiment illustrated in FIG. 7, tangential slot 62 performs the function of drain slot 60 illustrated in FIGS. 3, 9 and 10; there is no drain slot 60 in the embodiment illustrated in FIG. 7. As with drain slot 60, the edge 74A at the juncture of tangential slot 62 with annular channel 30 serves to stop the otherwise continuing circumferential flow of oil around annular channel 30.

Referring to FIG. 8, mating ring 70 has been sectioned to enhance drawing clarity and the portion of annular graphite sealing member 20 that is not hidden as depicted in hidden lines has been shaded, also to enhance drawing clarity. Mating ring 70 is retained in place by a plate 78 that is typically secured to the rotating shaft of the turbomachine. Similarly a mounting boss 80 preferably presses mating ring 70 against plate 78 with boss 80 preferably held in place via a retaining screw 82 for preferably unitary rotation of boss 80, mating ring 70 and the retaining screw 82, all preferably fixedly connected to the rotating shaft of the turbomachine, directly or indirectly. A plurality of plates 78, bosses 80, and screws 82 are preferably used to retain mating ring 70 in position within the turbomachine.

The annular graphite sealing member 20 is desirably biased against mating plate 70 preferably by wave spring 42 that preferably resides within a pocket 84 formed as a part of the graphite sealing member mounting structure within the turbomachine. The mounting structure is designated generally 86 in FIG. 8 and preferably includes an upper frame member 88 having a receptacle pocket therein to receive an upwardly projecting portion of annular graphite sealing member 20. Some of the upwardly projecting portion is shown in hidden lines in FIG. 8; it is not numbered in the drawings.

Mounting structure 86 further preferably includes a lower frame member 92 having a pocket formed therein within which preferably resides a preferably resilient member 90 that provides upward bias against the bottom of annular graphite sealing member 20, thereby retaining annular graphite sealing member 20 in the downwardly facing pocket formed in upper frame member 88, all as illustrated in FIG. 8. Mounting structure 86 is preferably secured to a non-rotating portion of the turbomachine by a plurality of mounting screws 94, one of which is illustrated in FIG. 8.

Figure 11:
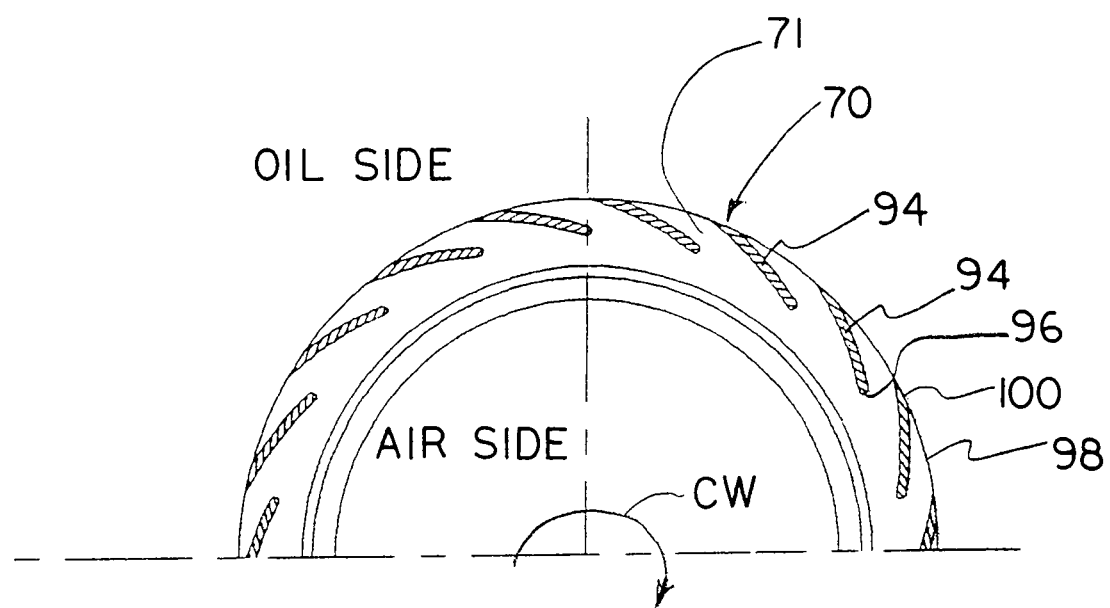
FIG. 11 is a schematic half elevation, taken perpendicularly to the central longitudinally extending axis of a turbomachine, of a grooved mating ring manifesting aspects of the invention.

Referring to FIG. 11, mating ring 70 is shown in an embodiment in which mating ring 70 has a series of grooves 84 formed therein. In the embodiment illustrated in FIG. 11, each groove has an inner terminus 96 that is inboard from an outer peripheral edge 98 of mating ring 70. Grooves 94 are positioned preferably such that at least a portion of the groove overlies annular channel 30 when mating ring 70 is in facing contact with annular graphite sealing member 20. As a result when mating ring 70 rotates in the clockwise direction illustrated in FIG. 11 as indicated by arrow "CW", oil that is in annular channel 30 migrates into a groove 94 and is drawn towards the outer terminus of groove 94, which is defined by intersection of groove 94 with outer peripheral edge 98 of mating ring 70. These grooves centrifugally throw the oil from the groove outer ends radially outwardly from the seal interface.

In some embodiments of the invention it may be desirable to have grooves 94 configured so as to overlie and communicate with first contact face 26 of first annular sealing dam 22, which is the innermore of the two annular sealing dams. In other embodiments and applications, it may be desirable to have the grooves only communicate with annular channel 30 and to have the inner terminus of each groove radially outboard of first contact face 26 of first annular sealing dam 22. In any event, in the configuration illustrated in FIG. 11, clockwise rotation of mating ring 70 serves to reduce oil weepage by throwing the oil radially outwardly from the seal interface.

Grooves 94 may be from about 0.0002 inches to about 0.010 inches in depth on the mating face 71 of mating ring 70.

Rotation of mating ring 70 results in creation of some vacuum at the inner terminus 96 of a groove 94 thereby lowering pressure in the annular channel 30 thereby further reducing the differential pressure across the first annular sealing dam 22 during a pressure reversal. This lower differential pressure across first annular sealing dam 22 reduces oil weepage to the air side. Typically if the oil side air pressure is 2 psig and the airside pressure is 0 psig during a pressure reversal, use of spiral grooves 94 such as illustrated in FIG. 11 reduces pressure in the annular channel 30 from 2 psig to 0 psig resulting in a differential pressure across the first annular sealing dam 22 of zero thereby substantially reducing and effectively eliminating oil weepage.

Figure 12:
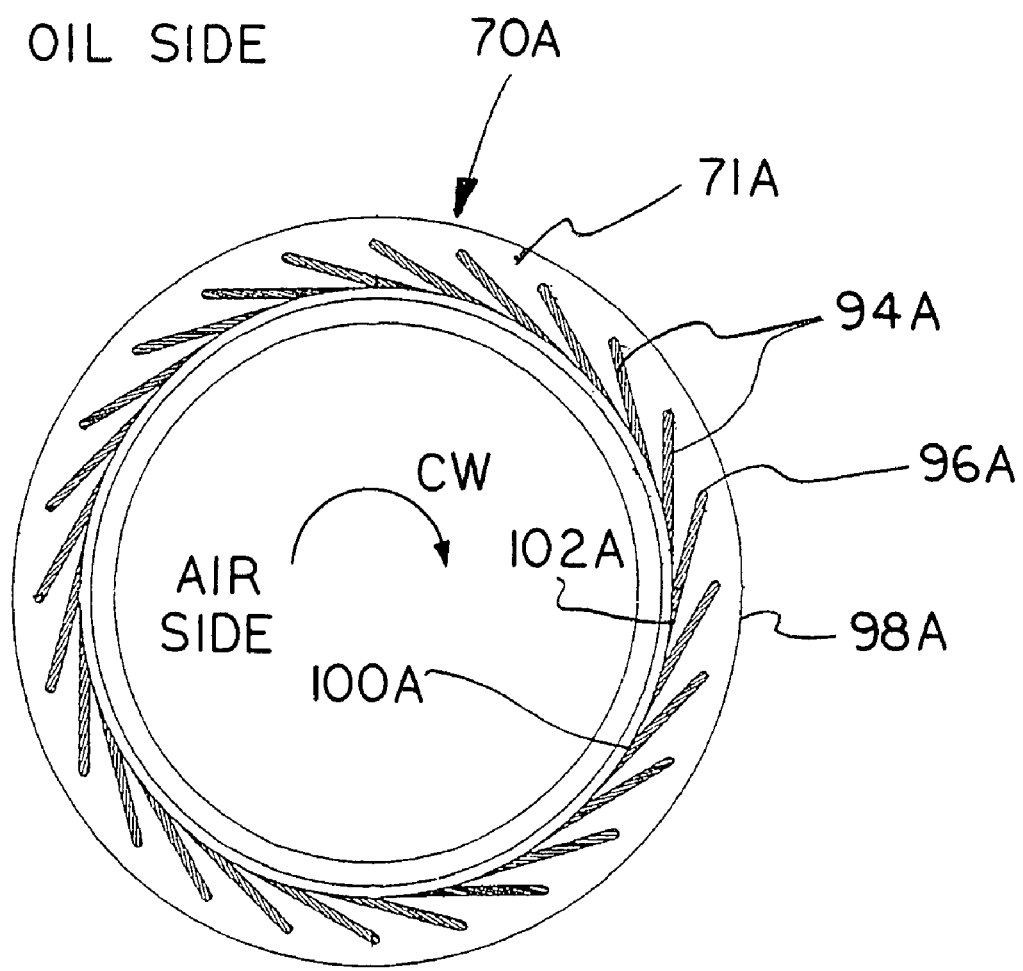
FIG. 12 is a schematic elevation, taken perpendicularly to the central longitudinally extending axis of a turbomachine, of an alternative configuration of a grooved mating ring manifesting aspects of the invention.

FIG. 12 illustrates an alternate embodiment of a mating ring having a mating face with grooves formed therein. In the embodiment illustrated in FIG. 12, grooves 94A are formed with their inner terminus in the area of mating ring face 71 that facingly contacts first and second contact faces 26, 28 of first and second annular sealing dams 22, 24. In the embodiment illustrated in FIG. 12, the outer extremity of each groove 94A is denoted 100A and is designated as an "outer terminus", meaning that it is removed from the interior portion of the mating face 71. However, as illustrated in FIG. 12, grooves 94A terminate or open at outer terminus 100A, which is defined by intersection of groove 94A with an inner peripheral edge 102A of mating ring 70A. In this aspect of the invention, rotation of mating ring 70A in a clockwise direction, as indicated by arrow CW in FIG. 12, serves to gather higher pressure air from the air side or interior of the turbomachine and drive that higher pressure air into grooves 94A which desirably communicate with annular channel 30. This has the effect of increasing air pressure in annular channel 30 desirably to a level above the pressure outboard of second annular sealing dam 24, thereby maximizing the pressure differential across second contact face 28 of second annular sealing dam 24 and preventing oil weepage across second contact face 28 of second annular sealing dam 24 from the oil side into annular channel 30. As with the grooves illustrated in FIG. 11, the grooves shown in FIG. 12 may range in depth from 0.0002 inches to 0.010 inches.

Referring again to FIGS. 3 and 6, dimensional arrows DD in FIG. 6 denote the depth of drain slot 60 illustrated in FIG. 3. Desirably drain slot 60 is about 0.030 inches deep relative to channel bottom 34. Drain slot 60 as indicated on FIG. 6.

Juncture between inclined wall 38 and channel bottom 34 is preferably a line and appears as such in many of the drawings; this juncture has been designated 40 in many of those drawings where it appears.

In one preferred practice of the invention, the diameter of the tunnel 14 is approximately six inches and overall diameter of the annular graphite sealing member including the mounting phalanges is about 7½ inches. Width of the first and second contact faces is on the order of 0.150 inches each.

A major advantage provided by the invention over the prior art is greatly increased apparent service life of the reverse pressure double dam face seal according to the invention versus prior art seals. Having two annular sealing dams 22, 24, with two contact faces 26, 28, permits use of reduced force biasing contact faces 26, 28 against mating ring 70. Use of two such annular sealing dams, with each having a contact face, increases the contact area between annular graphite sealing member 20 and mating face 71 of mating ring 70, thereby reducing unit load and improving seal life.

Preliminary tests involving a test rig and a single sealing dam biased against a mating face of a test purposes mating ring have shown that a one-third increase in the area of the contact face surface biased against the mating face of the mating ring may result in up to a four-fold increase in seal service life over that of prior art sealing member-mating ring combinations, when all other factors, including bias force, speed of rotation, dam material, ring material and the like are held constant. These preliminary tests indicate that with a one-third increase in the area of the annular graphite sealing member face surface, in sealing contact with the mating face of the mating ring, seal life increases from in the neighborhood of 38,000 hours to somewhere in the neighborhood of 220,000 hours. The figures are preliminary, test figures and do not represent production structures or materials. Those figures are predictive of a greatly increased service life for reverse pressure double dam face seal assemblies according to the invention.

The invention claimed is:

1. A double dam reverse pressure face seal assembly for use in a turbomachine having a tunnel extending therethrough for high pressure air passage therealong during normal machine operation, comprising;
  a) a mating ring, positioned annularly respecting the tunnel, for flow of lubricating oil generally outwardly through passageways in the ring;
  b) a member biased against an interface surface of the mating ring, the member including:
    (1) a first dam presenting a first contact face to the interface surface of the mating ring;
    (2) a second dam integral with and outboard of the first dam, presenting a second contact face to the interface surface of the mating ring; and
    (3) a channel between the first and second dams for annularly downward flow of oil leaking inwardly past the second dam towards a channel exit.

2. The assembly of claim 1 wherein
  a) the channel has a bottom that is parallel with the first and second contact faces;
  b) the first contact face is connected to the channel bottom by a wall that is perpendicular to the first contact face and to the planar bottom; and
  c) the second contact face is connected to the channel bottom by a wall running diagonally between the second contact face and the channel bottom.

3. The assembly of claim 2 wherein the diagonal wall is at an angle of about 30 degrees relative to the second contact face.

4. The assembly of claim 1 wherein
  a) the channel has a flat bottom;
  b) the first contact face is connected to the channel bottom by a wall that is perpendicular to the flat bottom; and
  c) the second contact face is connected to the channel bottom by a wall running diagonally to the channel bottom.

5. A turbomachine with a tunnel extending therethrough for high pressure air travel through the turbomachine during normal machine operation and including a double dam pressure reversal face seal assembly separating a region of the tunnel having high pressure air traveling therethrough from an adjacent lubricating oil region that is at lower pressure than the air traveling through the tunnel during normal operation, comprising;
  a) a rotatable apertured mating ring, positioned annularly respecting the tunnel, for flow of lubricating oil from within the tunnel generally outwardly through the apertures to the lubricating oil region;
  b) a stationary member biased against an interface surface of the mating ring, the member including:
    (1) a first annular sealing dam presenting a first contact face to the interface surface of the mating ring;
    (2) a second annular sealing dam outboard of the first annular sealing dam, presenting a second contact face to the interface surface of the mating ring, the second annular sealing dam being integral with the first sealing dam;
    (3) an annular channel between the first and second annular sealing dams for flow of oil leaking inwardly from the lubricating oil region past the second annular dam downwardly towards a channel exit.

6. The turbomachine of claim 5 in which the mating ring further comprises grooves formed in the mating ring surface facingly contacting the stationary member and positioned to communicate with the annular channel as the mating ring facingly contacts the stationary member, the grooves communicating with an outer edge of the mating ring but terminating short of an inner edge of the mating ring, and being shaped such that a groove inner terminus rotatingly leads a groove outer terminus during mating ring rotation in the course of normal machine operation.

7. The turbomachine of claim 6 wherein portions of the grooves overlie the annular channel when the mating ring facingly contacts the stationary member.

8. The turbomachine of claim 7 wherein the grooves are curved.

9. The turbomachine of claim 7 wherein the grooves are straight.

10. The turbomachine of claim 7 wherein the grooves are spiral shaped.

11. The turbomachine of claim 6 wherein the inner termini of the grooves overlie at least a part of the annular channel when the mating ring facingly contacts the stationary member.

12. The turbomachine of claim 5 wherein
a) the channel has a bottom that is parallel with the first and second contact faces;
b) the first contact face is connected to the channel bottom by a wall that is perpendicular to the first contact face and to the planar bottom; and
c) the second contact face is connected to the channel bottom by a wall running diagonally between the second contact face and the channel bottom.

13. The turbomachine of claim 12 wherein the diagonal wall is at an angle of about 30 degrees relative to the second contact face.

14. The turbomachine of claim 5 wherein
a) the channel has a flat bottom;
b) the first contact face is connected to the channel bottom by a wall that is perpendicular to the flat bottom; and
c) the second contact face is connected to the channel bottom by a wall running diagonally to the channel bottom.

15. A double dam reverse pressure face seal assembly for use in a turbomachine having a tunnel extending therethrough for high pressure air passage therein during normal machine operation, comprising;
a) an apertured mating ring having generally radial passageways extending therethrough commencing at the apertures, the ring being positioned annularly respecting the tunnel, for flow of lubricating oil generally outwardly through the radial passageways; and
b) a non-rotating member for contacting an interface surface of the mating ring, the member including:
(1) a first sealing dam presenting a first contact face to the interface surface of the mating ring;
(2) a second sealing dam radially outboard of the first sealing dam, presenting a second contact face to the interface surface of the mating ring, the second sealing dam being integral with the first sealing dam;
(3) a channel between and integrally formed with the first and second sealing dams for receiving flow of lubricant oil leaking inwardly past the second sealing dam;
(4) the mating ring having grooves formed in the surface facingly contacting the stationary member, the grooves communicating with an outer edge of the mating ring, each groove at least partially overlying the channel when the mating ring facingly contacts the stationary member but terminating short of an inner edge of the mating ring, shaped such that a groove inner terminus leads a groove outer terminus during mating ring rotation in the course of normal machine operation.

16. The double dam reverse pressure face seal assembly of claim 15 wherein the non-rotating member further includes a horizontal groove formed in the second sealing dam, oriented tangentially respecting the channel, of depth greater than the bottom of the channel and positioned at the bottom of the stationery member, to facilitate collective oil flow out of the channel in a horizontal direction tangential to that of rotation of the mating ring during machine operation.

17. The double dam reverse pressure face seal assembly of claim 16 further comprising of wave spring for biasing the non-rotating member against the mating ring.

18. The double dam reverse pressure face seal assembly of claim 16 wherein the non-rotating member is annular.

19. The double dam reverse pressure face seal assembly of claim 18 wherein the non-rotating member is graphite.

20. The double dam reverse pressure face seal assembly of claim 15 wherein the first sealing dam is annular.

21. The double dam reverse pressure face seal assembly of claim 15 wherein the mating ring is metal.

22. The double dam reverse pressure face seal assembly of claim 15 wherein the sealing dam contact faces are parallel one with another.

23. The assembly of claim 15 wherein the first contact face is larger than the second contact face.

24. A double dam reverse pressure face seal assembly for use in a turbomachine having a tunnel extending therethrough for high pressure air passage therein during normal machine operation, comprising;
a) an apertured rotatable annular mating ring having generally radial passageways extending therethrough commencing at the apertures, the ring being positioned annularly respecting the tunnel, for flow of lubricating oil generally outwardly through the radial passageways; and
b) a non-rotating member for contacting an interface surface of the mating ring, the member including:
(1) a first sealing dam presenting a first contact face to the interface surface of the mating ring;
(2) a second sealing dam radially outboard of the first sealing dam, presenting a second contact face to the interface surface of the mating ring, the second sealing dam being integral with the first sealing dam;
(3) a channel between and integrally formed with the first and second sealing dams for recurrent flow of lubricant oil leaking inwardly;
(4) the mating ring having grooves formed in the surface facingly contacting the stationary member, the grooves commencing at an interior portion of the mating ring defining the groove inner terminus such that at least a first portion of each groove proximate the radially inward extremity of a groove overlies at least a portion of the channel and at least a second portion of each groove communicates with an outer edge of the mating ring, thereby defining the groove outer terminus with the grooves being shaped such that a groove inner terminus leads the groove outer terminus as the mating ring rotates during machine normal operation.

25. The assembly of claim 24 wherein
a) the channel has a bottom that is parallel with the first and second contact faces;
b) the first contact face is connected to the channel bottom by a wall that is perpendicular to the first contact face and to the planar bottom; and
c) the second contact face is connected to the channel bottom by a wall running diagonally between the second contact face and the channel bottom.

26. The assembly of claim 25 wherein the diagonal wall is at an angle of about 30 degrees relative to the second contact face.

27. The assembly of claim 25 wherein the grooves are straight.

28. The assembly of claim 25 wherein the grooves are curved.

29. The assembly of claim 25 wherein the grooves are spiral shaped.

30. The assembly of claim 25 wherein the grooves are tangent with an exterior edge of the mating ring.

31. The assembly of claim 25 wherein the first contact face is larger than the second contact face.

32. The assembly of claim 24 wherein
a) the channel has a flat bottom;
b) the first contact face is connected to the channel bottom by a wall that is perpendicular to the flat bottom; and c) the second contact face is connected to the channel bottom by a wall running diagonally to the channel bottom.

33. A double dam reverse pressure face seal assembly for use in a turbomachine having a tunnel extending therethrough for high pressure air passage therein during normal machine operation, comprising;
 a) an apertured rotatable annular mating ring having generally radial passageways extending therethrough commencing at the apertures, the ring being positioned annularly respecting the tunnel, for flow of lubricating oil generally outwardly through the radial passageways; and
 b) a non-rotating member for contacting an interface surface of the mating ring, the member including:
  (1) a first sealing dam presenting a first contact face to the interface surface of the mating ring;
  (2) a second sealing dam radially outboard of the first sealing dam, presenting a second contact face to the interface surface of the mating ring, the second sealing dam being integral with the first sealing dam;
  (3) a channel between and integrally formed with the first and second sealing dams for recurrent flow of lubricant oil leaking inwardly;
  (4) the mating ring having grooves formed in the surface facingly contacting the stationary member, the grooves extending between an interior portion of the mating ring defining a groove inner terminus such that at least a first portion of each groove proximate the radially inward extremity of a groove overlies at least a portion of the channel and at least a second portion of each groove communicates with an inner edge of the mating ring, with the grooves being shaped such that the second portion of each groove leads a groove inner terminus as the mating ring rotates during normal machine operation.

34. The assembly of claim 33 wherein
 a) the channel has a bottom that is parallel with the first and second contact faces;
 b) the first contact face is connected to the channel bottom by a wall that is perpendicular to the first contact face and to the planar bottom; and
 c) the second contact face is connected to the channel bottom by a wall running diagonally between the second contact face and the channel bottom.

35. The assembly of claim 34 wherein the diagonal wall is at an angle of about 30 degrees relative to the second contact face.

36. The assembly of claim 34 wherein the grooves are straight.

37. The assembly of claim 34 wherein the grooves are curved.

38. The assembly of claim 34 wherein the grooves are spiral shaped.

39. The assembly of claim 34 wherein the grooves are tangent with an interior edge of the mating ring.

40. The assembly of claim 34 wherein the first contact face is larger than the second contact face.

41. The assembly of claim 33 wherein
 a) the channel has a flat bottom;
 b) the first contact face is connected to the channel bottom by a wall that is perpendicular to the flat bottom; and
 c) the second contact face is connected to the channel bottom by a wall running diagonally to the channel bottom.

42. A method for sealing a turbomachine tunnel, having high pressure air passing therethrough during normal operation, against lubricating oil leakage thereinto from an adjacent area that is normally filled with oil mist at pressure substantially lower than the high pressure air, upon a pressure reversal and the adjacent area reaching pressure higher than in the tunnel, comprising the steps of:
 a) positioning a second face sealing member coaxially radially outboard of and spaced from a conventional stationary first face sealing member, to contact a rotatable mating ring outboard of the conventional stationary face sealing member, with the second face sealing member being longitudinally aligned with but radially spaced from the first sealing member to define an annular closed bottom channel therebetween; and
 b) providing an outlet from the channel through the second sealing member at the vertical bottom of the second sealing member for passage of oil therethrough from the annular passageway between the sealing members into the oil mist area.

43. The method of claim 42 further comprising
 a) providing grooves in a surface of the mating ring facingly contacting the first and second face sealing members with the grooves communicating with an outer edge of the mating ring but terminating short of an inner edge of the mating ring and shaped such that a groove inner terminus rotatingly leads a groove outer terminus during mating ring rotation during normal operation and,
 b) positioning the mating ring so that portions of the grooves overlie an annular channel between first and second face sealing members whereby windage draws oil from the channel through the grooves and outwardly of the outboard one of the face sealing members.

44. The method of claim 43 further comprising providing grooves that are curved.

45. The method of claim 42 further comprising
 a) providing grooves in a surface of the mating ring facingly contacting the first and second face sealing members with the grooves communicating with an inner edge of the mating ring but terminating short of an outer edge of the mating ring and shaped such that a groove radially inner terminus rotatingly leads a groove radially outer terminus during mating ring rotation during normal operation and,
 b) positioning the mating ring so that portions of the grooves overlie an annular channel between first and second face sealing members whereby windage draws air from the tunnel through the grooves and into the annular channel between the face sealing members.

46. The method of claim 45 further comprising providing grooves that are straight.

* * * * *